(12) United States Patent
Wolf et al.

(10) Patent No.: US 10,279,855 B2
(45) Date of Patent: May 7, 2019

(54) DEVICE AND METHOD FOR THEFT DETECTION

(71) Applicant: Robert Bosch GmbH, Stuttgart (DE)

(72) Inventors: Hannes Wolf, Dusslingen (DE); Hans-Uwe Rempler, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/750,258

(22) PCT Filed: Jul. 15, 2016

(86) PCT No.: PCT/EP2016/066967
§ 371 (c)(1),
(2) Date: Feb. 5, 2018

(87) PCT Pub. No.: WO2017/021126
PCT Pub. Date: Feb. 9, 2017

(65) Prior Publication Data
US 2018/0222540 A1 Aug. 9, 2018

(30) Foreign Application Priority Data
Aug. 5, 2015 (DE) .................. 10 2015 214 892

(51) Int. Cl.
*B62H 5/20* (2006.01)
*B60R 25/10* (2013.01)
(Continued)

(52) U.S. Cl.
CPC ............ *B62H 5/20* (2013.01); *B60R 25/10* (2013.01); *B62J 99/00* (2013.01); *G01C 21/165* (2013.01);
(Continued)

(58) Field of Classification Search
CPC ............... G08B 13/1436; G08B 13/14; G08B 21/0225; B62H 5/20; A47F 7/024
See application file for complete search history.

(56) References Cited

U.S. PATENT DOCUMENTS

| 6,060,982 | A | 5/2000 | Holtrop | |
|---|---|---|---|---|
| 2009/0015400 | A1* | 1/2009 | Breed | B60C 11/24 340/539.22 |
| 2010/0032332 | A1* | 2/2010 | Davis | G08B 13/1436 206/459.1 |
| 2010/0321185 | A1* | 12/2010 | Bernhard | B62B 5/0423 340/551 |

(Continued)

FOREIGN PATENT DOCUMENTS

| AU | 002012254998 A1 | 12/2013 |
|---|---|---|
| GB | 2481074 A | 12/2011 |

OTHER PUBLICATIONS

International Search Report dated Sep. 30, 2016, of the corresponding International Application PCT/EP2016/066967 filed Jul. 15, 2016.

(Continued)

*Primary Examiner* — Hongmin Fan
(74) *Attorney, Agent, or Firm* — Norton Rose Fulbright US LLP; Gerard Messina

(57) ABSTRACT

An apparatus for theft detection including a processing unit and a communication interface, the apparatus being provided for stationary mounting on a mobile object. The apparatus has at least an acceleration sensor, a rotation rate sensor, and a magnetic field sensor. The processing unit is furthermore configured to acquire an acceleration signal of the acceleration sensor, a rotation rate signal of the rotation rate sensor, and a magnetic field signal of the magnetic field sensor within a time span, and to determine a change in relative position of the apparatus as a function of the (Continued)

acceleration signal, the rotation rate signal, and the magnetic field signal. The processing unit is also configured to output a first signal by way of the communication interface if the change in position is greater than a first threshold value. A method for theft detection is also described.

14 Claims, 3 Drawing Sheets

(51) Int. Cl.
G01C 21/16 (2006.01)
B62J 99/00 (2009.01)
G01S 19/47 (2010.01)

(52) U.S. Cl.
CPC ......... *G01S 19/47* (2013.01); *B62J 2099/002* (2013.01); *B62J 2099/004* (2013.01)

(56) References Cited

U.S. PATENT DOCUMENTS

| | | | |
|---|---|---|---|
| 2012/0293330 A1 | 11/2012 | Grant et al. | |
| 2013/0257616 A1* | 10/2013 | Taylor | G08B 21/0225 340/568.2 |
| 2015/0156567 A1* | 6/2015 | Oliver | H04W 4/80 340/870.07 |
| 2015/0310714 A1* | 10/2015 | Loveland | G08B 21/22 340/539.11 |

OTHER PUBLICATIONS

Yun, X. [et. al.]: Estimation of Human Foot Motion During Normal Walking Using Intertial and Magnetic Sensor Measurements In: IEEE Transactions on Instruments and Measurement, vol. 61 No. 7, 2012, S. 2059-2072.

* cited by examiner

DEVICE AND METHOD FOR THEFT DETECTION

BACKGROUND INFORMATION

The present invention relates to an apparatus for theft detection having a processing unit and a communication interface, the apparatus being provided for stationary mounting on a mobile object. An apparatus for theft detection is described, for example, in U.S. Pat. No. 6,060,982 A.

With movable objects, the risk exists that they may be stolen. It is therefore sensible to monitor such objects, to detect an attempted theft, and to report it correspondingly. This is useful in particular for two-wheelers, since they are often stolen. In order to prevent theft, there are apparatuses and methods that can detect an attempted theft and correspondingly trigger an alarm.

SUMMARY

The present invention relates to an apparatus for theft detection having a processing unit and a communication interface, the apparatus being provided for stationary mounting on a mobile object. In accordance with the present invention, the apparatus has at least an acceleration sensor, a rotation rate sensor, and a magnetic field sensor. The processing unit is furthermore configured to acquire an acceleration signal of the acceleration sensor, a rotation rate signal of the rotation rate sensor, and a magnetic field signal of the magnetic field sensor within a time span, and to determine a change in relative position of the apparatus as a function of the acceleration signal, the rotation rate signal, and the magnetic field signal.

The processing unit is furthermore configured to output a first signal by way of the communication interface if the change in position is greater than a first threshold value.

It is advantageous in this context that a security zone around the object can be defined by way of the first threshold value. If the object leaves that defined security zone, the first signal is outputted, signaling an alarm. False alarms can thereby be appreciably decreased. For example, if a monitored object is merely displaced within the security zone in order to access an article located behind it, but if that object is not moved out of the security zone, an alarm will not be triggered even though the object has been moved. Determination of the change in relative position of the apparatus as a function of the acceleration signal, the rotation rate signal, and the magnetic field signal furthermore results in inertial navigation with very high accuracy.

An advantageous embodiment of the present invention provides that the apparatus is configured to be brought by way of the communication interface into a monitoring state, and to terminate that state again. This is advantageous in that monitoring of an object can be deliberately activated, and deactivated again, by way of the apparatus.

According to an advantageous embodiment of the present invention, provision is made that the processing unit is configured to output a second signal by way of the communication interface if the change in position is greater than a second threshold value, the second threshold value being less than the first threshold value.

This is advantageous in that the second threshold can be used to define a further zone around the object. This further zone is smaller than the security zone defined by the first threshold value. If the object then leaves this second zone, a second signal is outputted; this can, for example, inform the owner of the object that the object is being moved and that a potential theft attempt is imminent.

A further advantageous embodiment of the present invention provides that the processing unit is configured to receive an interrupt signal from the acceleration sensor or also from the rotation rate sensor or also from the magnetic field sensor or also from a further sensor.

This is advantageous in that an interrupt signal indicates a possible imminent theft attempt. Determination of the change in relative position can then be started. As a result, the apparatus can be operated in a standby mode until such an interrupt signal arrives. This in turn results in very low energy consumption by the apparatus.

According to a further advantageous embodiment of the present invention, provision is made that the further sensor is a light sensor or also a microphone.

This is advantageous in that a change in ambient brightness can be detected by way of the light sensor, for example if the object is taken outdoors from a room. A change in the noise environment around the object can furthermore be detected by way of the microphone, for example if the object is moved away from a quiet parking area.

In an advantageous embodiment of the present invention, provision is made that the communication interface has at least one radio module, in particular a GSM, Bluetooth, and/or WLAN module.

This is advantageous in that the first signal or also the second signal can be emitted wirelessly thanks to the radio module. It is moreover also possible by way of such a radio module to wirelessly activate and deactivate monitoring of the object by the apparatus.

In an advantageous embodiment of the present invention, provision is made that the apparatus has a GPS module.

This is advantageous in that by way of the GPS module, an absolute position determination of the apparatus can be effected if necessary. The absolute position can be used to locate the stolen object again.

In a further advantageous embodiment of the present invention, provision is made that the processing unit is configured to acquire the first threshold value or also a second threshold value.

This is advantageous in that the first threshold value and the second threshold value can be predefined, for example, by the owner of the object. The security zone, and the zone in which a notification is to be outputted to the user, can thereby be set in situation-dependent fashion.

The invention furthermore relates to a method for theft detection using an apparatus that has an acceleration sensor, a rotation rate sensor, and a magnetic field sensor, having at least the following method steps:
  a. acquiring an acceleration signal of the acceleration sensor, a rotation rate signal of the rotation rate sensor, and a magnetic field signal of the magnetic field sensor within a time span;
  b. determining a change in relative position of the apparatus as a function of the acceleration signal, the rotation rate signal, and the magnetic field signal;
  c. comparing the change in position with at least a first threshold;
  d. outputting a first signal if the change in position is greater than the at least first threshold value.

This is advantageous in that a security zone around the object can be defined by way of the first threshold value. If the object leaves that defined security zone, the first signal, which signals an alarm, is outputted. False alarms can thereby be appreciably decreased. For example, if a monitored object is merely displaced within the security zone in order to access an article located behind it, but if that object is not moved out of the security zone, an alarm will not be triggered even though the object has been moved.

In an advantageous embodiment of the method according to the present invention, provision is made for a method step e, which executes before method step a and in which the apparatus is brought into a monitoring state, and for a method step f, which executes after method step c or d and in which a check is made as to whether the monitoring state has been terminated, the method being terminated if so, and execution continuing with method step a if not.

This is advantageous in that monitoring of an object by the apparatus can be deliberately activated and also deactivated again.

According to an advantageous embodiment of the method according to the present invention, provision is made for a method step g, which executes directly before method step a and in which an interrupt signal is received from the acceleration sensor or the rotation rate sensor or the magnetic field sensor or also a further sensor.

This is advantageous in that an interrupt signal indicates a possible imminent theft attempt. Determination of the change in relative position can then be started. As a result, the apparatus can be operated in a standby mode until such an interrupt signal arrives. This in turn results in very low energy consumption.

In accordance with a further advantageous embodiment of the method according to the present invention, provision is made for additional execution of a method step h in which the change in position is compared with a second threshold value that is less than the first threshold value, and of a method step i in which a second signal is outputted if the change in position is greater than the second threshold value.

This is advantageous in that the second threshold can be used to define a further zone around the object. This further zone is smaller than the security zone defined by the first threshold value. If the object then leaves this second zone, a second signal is outputted; this can, for example, inform the owner of the object that the object is being moved and that a potential theft attempt is imminent.

In an advantageous embodiment of the method according to the present invention, provision is made for a method step k, which executes before method step b and in which the first threshold value or also a second threshold value is acquired.

This is advantageous in that the first threshold value and the second threshold value can be predefined, for example, by the owner of the object. The security zone, and the zone in which a notification is to be outputted to the user, can thereby be set in situation-dependent fashion.

In an advantageous embodiment of the method according to the present invention, provision is made that the change in relative position is determined in method step b as follows:

I. sample the acceleration signal, the rotation rate signal, and the magnetic field signal in order to obtain measured values;
II. filter the measured values;
III. interpolate between the measured values;
IV. fuse the measured values in order to determine a gravity vector, an orientation, and a linear acceleration;
V. correct the measured values for a linear acceleration less than an acceleration noise threshold value;
VI. correct a positioning error using an extended Kalman filter;
VII. determine the change in relative position of the apparatus as a function of the ascertained gravity vector, the orientation, and the linear acceleration.

This is advantageous in that filtering of the measured values smooths the sampled signal in order to filter out any high-frequency noise components that are still present, and signal components that are not relevant for the application. As a result of the interpolation, different sampling rates for the acceleration signal, the rotation rate signal, and the magnetic field signal can furthermore be equalized, and aliasing effects can be avoided or reduced. Correction of the measured values and of the positioning error moreover allows integration errors in the determination of the change in relative position of the apparatus to be attenuated, so that the change in position can be determined more exactly.

DETAILED DESCRIPTION OF EXAMPLE EMBODIMENTS

Figure 1:
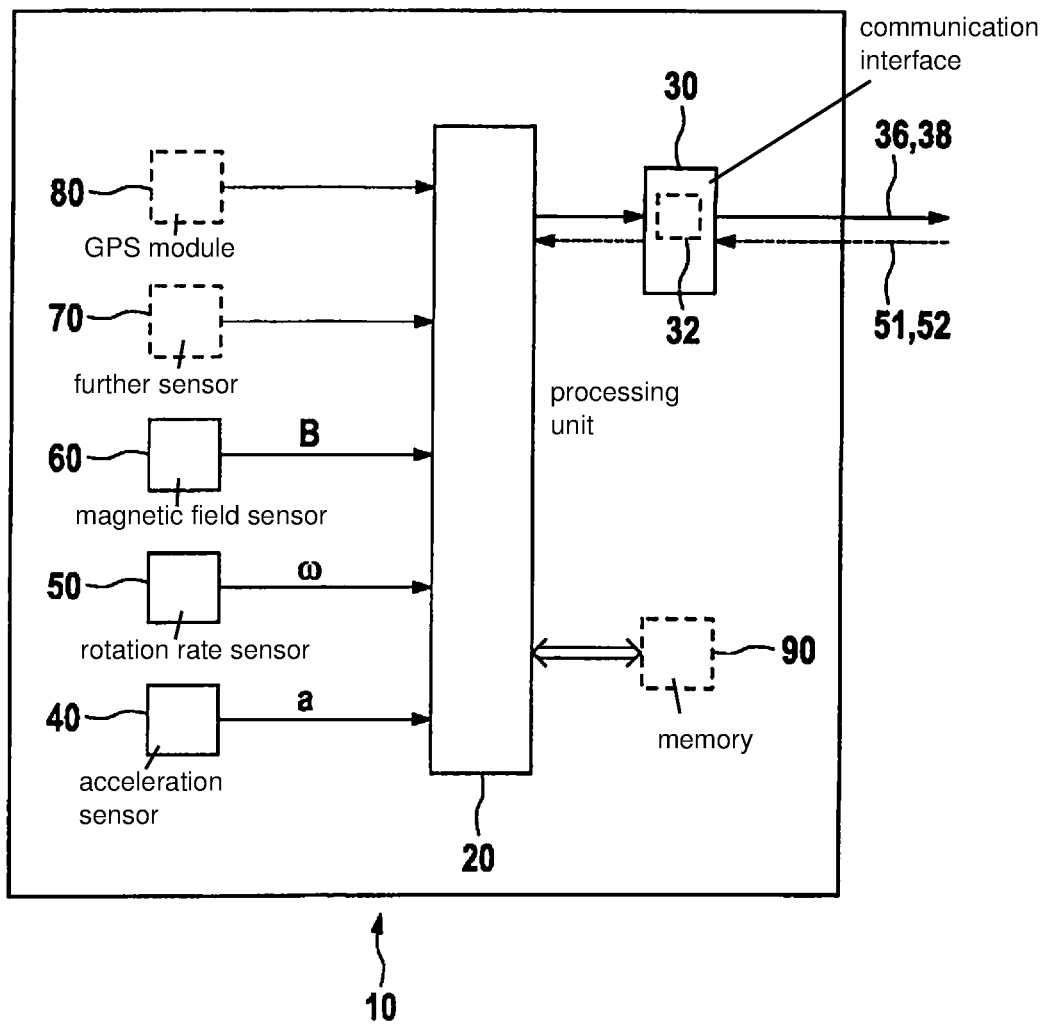
FIG. 1 shows an exemplifying embodiment of an apparatus according to the present invention.

FIG. 1 shows an exemplifying embodiment of an apparatus according to the present invention, depicting apparatus 10 that has a processing unit 20. Processing unit 20 is, for example, a microcontroller. Apparatus 10 furthermore has a communication interface 30. Communication interface 30 is connected to processing unit 20. This connection enables a bidirectional data flow. Alternatively, at least one unidirectional connection from processing unit 20 to communication interface 30 is provided. Apparatus 10 also has an acceleration sensor 40, a rotation rate sensor 50, and a magnetic field sensor 60. Acceleration sensor 40, rotation rate sensor 50, and magnetic field sensor 60 are connected to processing unit 20 in such a way that processing unit 20 can acquire an acceleration signal $a_1$ of acceleration sensor 40, a rotation rate signal $\omega$ of rotation rate sensor 50, and a magnetic field signal B of magnetic field sensor 60 within a time span. A unidirectional connection to processing unit 20 is sufficient in this context. The processing unit is furthermore configured to determine a change in relative position $\Delta P$ of apparatus 10 as a function of acceleration signal $a_1$, rotation rate signal $\omega$, and magnetic field signal B, and to output a first signal 36 if the change in relative position $\Delta P$ is greater than a first threshold value S1. Apparatus 10 furthermore optionally also has a GPS module 80 that is configured to ascertain an absolute position of apparatus 10. GPS module 80 can convey the absolute position to processing unit 20 via a unidirectional connection. Optionally, apparatus 10 also has a memory 90 that is connected bidirectionally to processing unit 90. Apparatus 10 furthermore optionally has a further sensor 70. This further sensor 70 can be configured as a light sensor or also as a microphone. Communication interface 30 optionally has a radio module 32 that is configured, for example, as a GSM module, Bluetooth module, or also a WLAN module. Radio module 32 can be configured to activate or also deactivate apparatus 10. Radio module 32 can also be configured, for example, to emit first signal 36, a second signal 38, or also the absolute position of apparatus 10 if it has been ascertained by GPS module 80.

In an alternative exemplifying embodiment that is not depicted graphically, communication interface 30 additionally has a loudspeaker or also a light-emitting means with which first signal 36 or also second signal 38 can be outputted. In a further alternative exemplifying embodiment that is not graphically depicted, communication interface 30 optionally has a lock for respectively activating and deactivating apparatus 10.

The mounting of apparatus 10 in or on the object to be monitored, for example a two-wheeler, is not depicted graphically. It is thus possible for apparatus 10 to be integrated into the object, for example into the frame of a two-wheeler, thereby making mechanical access from outside, in particular by unauthorized persons, appreciably more difficult. Apparatus 10 is moreover thereby not visible from outside. If such integration into the object is not possible, the apparatus is then attached to the object preferably in locking fashion and in a manner that is nondetachable, or detachable only with enormous effort or also using special tools, by unauthorized persons.

Figure 2:
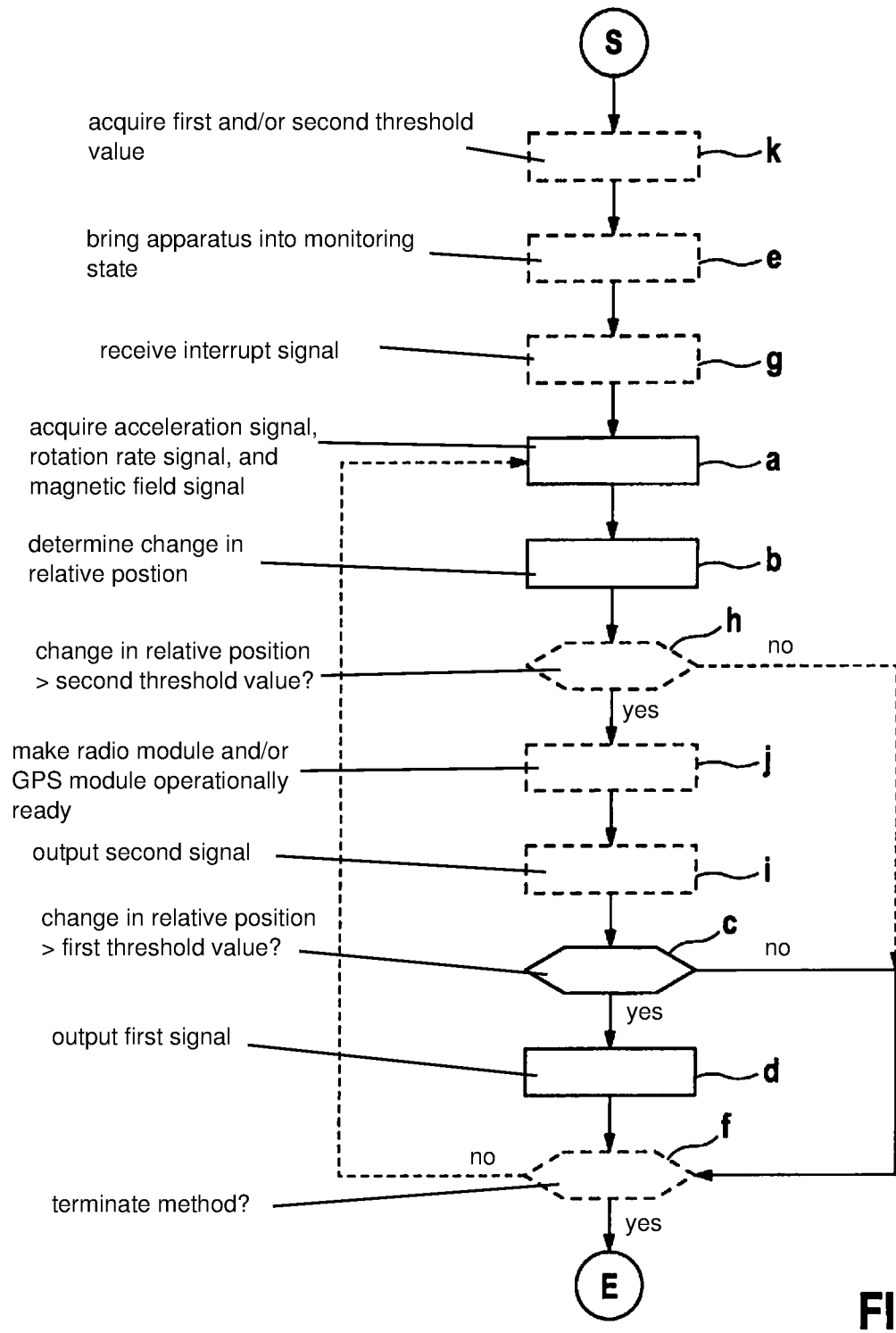
FIG. 2 shows an exemplifying embodiment of a method according to the present invention.

FIG. 2 shows an exemplifying embodiment of a method according to the present invention which executes on an apparatus 10 having at least an acceleration sensor 40, a rotation rate sensor 50, and a magnetic field sensor 60. In the method, after starting S, a method step a is performed. In method step a, an acceleration signal $a_1$ of acceleration sensor 40, a rotation rate signal $\omega$ of rotation rate sensor 50, and a magnetic field signal B of magnetic field sensor 60 are acquired within a time span. In a method step b, a change in relative position $\Delta P$ of apparatus 10 is then determined as a function of the acceleration signal $a_1$, the rotation rate signal $\omega$, and the magnetic field signal B. In a method step c, the change in relative position $\Delta P$ is then compared with a first threshold value S1. If the change in position $\Delta P$ is greater than the first threshold value S1, then in a method step d a first signal 36 is outputted. This first signal 36 signals a theft, and is to be identified with an alarm. The first signal 36 can be outputted optically, acoustically, or also via radio, in order thereby to make passersby, the police, or also the owner of the object aware of the theft. After method step d or after method step c, if the change in position $\Delta P$ is less than or equal to the first threshold value S1, the method can be terminated. The method optionally has a method step e, which executes before method step a and in which apparatus 10 is brought into a monitoring state, and a method step f, which executes after method step c or d and in which a check is made as to whether the method should in fact be terminated, a check being made for that purpose as to whether the monitoring state has been terminated. If the monitoring state has been terminated, the method is terminated; if it is not yet terminated, however, execution continues with method step a. The method furthermore has an additional, optional method step g. In this method step g, an interrupt signal is received from acceleration sensor 40 or also rotation rate sensor 50 or also magnetic field sensor 60, or also a further sensor 70. The method also optionally has a method step h and a method step i, which execute after method step b. In method step h, the change in relative position $\Delta P$ of apparatus 10 is compared with a second threshold value S2, the second threshold value S2 being less than the first threshold value S1. If it is found in this context that the change in relative position $\Delta P$ is greater than the second threshold value S2, method step i is then executed. In method step i, a second signal 38 is outputted. This second signal 38 serves as a notification to the owner of the object to be protected that a theft attempt is potentially in progress and a theft might be imminent. The method moreover has a further, optional method step j, which executes between method step h and method step i but at least before method step d. In method step j, a radio module 32 or also a GPS module 80 is made operationally ready. The method furthermore has an optional method step k, which executes before method step b and in which the first threshold value S1 or also the second threshold value S2 is acquired.

Figure 3:
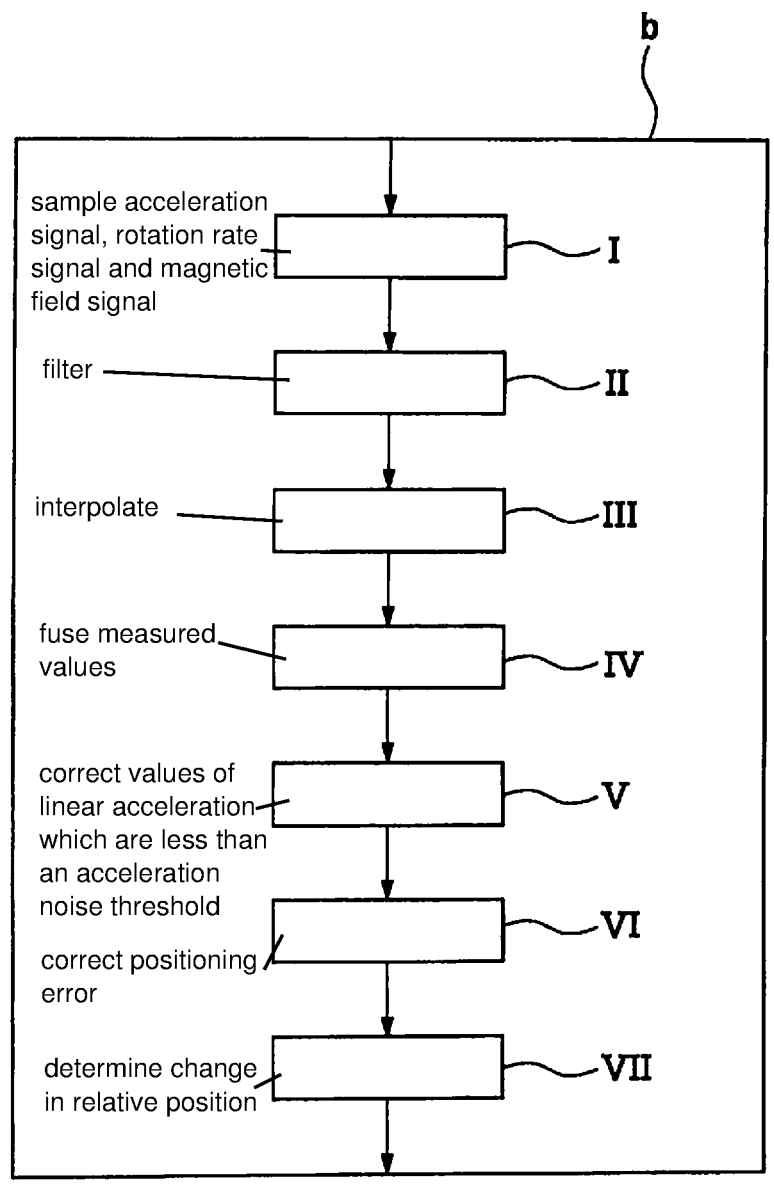
FIG. 3 shows in detail the determination in accordance with method step b, shown in FIG. 2, of a change in relative position of the apparatus.

FIG. 3 shows in detail the determination in accordance with method step b, shown in FIG. 2, of a change in relative position of the apparatus. In a method step I, the acceleration signal $a_1$, the rotation rate signal $\omega$, and the magnetic field signal B are sampled in order to obtain respective measured values. A sampling rate of up to 100 Hz is selected here, since movement of the object is being carried out by a human being, and a mechanical signal has a frequency of at most 40 Hz. The sampling rate can, however, assume different values for the various signals. It is thus possible that the signals are not all sampled simultaneously. It should furthermore be noted, in the context of selecting the sampling rate, that the higher the sampling rate, the greater also the noise resulting from sampling. Method step I is followed by a method step II in which the measured values that have been obtained are filtered. This is usually accomplished with a low-pass filter. In a subsequent method step III, an interpolation between the measured values occurs. For this, the measured values are normalized over time and then interpolated smoothly; this can be done, for example, using a higher-order polynomial or a Bezier curve. If applicable, values are also inserted in order to avoid or also reduce aliasing effects. A further method step IV, in which a fusion of the measured values occurs, is then carried out. The result is that a gravity vector $g_1$ acting on the apparatus, an orientation x-y-z of the apparatus, and a linear acceleration $a_{lin}$ are determined. To calculate the linear acceleration $a_{lin}$ of apparatus 10, the gravity vector $g_1$ that is acting on apparatus 10 must be subtracted from the measured values of the acceleration signal $a_1$. The measured values of the rotation rate signal $\omega$ and of the magnetic field signal B are used in order to ascertain the position of apparatus 10 and thus the direction of gravity vector $g_1$. The linear acceleration $a_{lin}$ can then, later on, be integrated twice over the time span within which the acceleration signal $a_1$ was acquired, in order to determine the change in relative position $\Delta P$ of apparatus 10. In order to avoid or reduce the occurrence of errors in the context of integration, a method step V and a method step VI are carried out before the change in relative position $\Delta P$ is determined. In method step V, those values of the linear acceleration $a_{lin}$ which are less than an acceleration noise threshold value $S_R$ are corrected. This is the case in particular if the movement of the object is not continuous. A zero value update for these values, which is used to correct a positioning error $F_P$, is then triggered. (Step IV.) A zero value update sets a measured acceleration value to zero in order to set the current acceleration and speed, and thus also the change in position $\Delta P$, to zero for that point in time. The positioning error $F_P$ is expressed as an error model of a Kalman filter, which results, when the zero value update is used, in only a small offset upon subsequent determination of the change in relative position $\Delta P$ in method step VII.

What is claimed is:

1. An apparatus for theft detection, comprising:
a processing unit;
a communication interface; and
at least one acceleration sensor, a rotation rate sensor, and a magnetic field sensor;
wherein the processing unit is configured to acquire an acceleration signal of the acceleration sensor, a rotation rate signal of the rotation rate sensor, and a magnetic field signal of the magnetic field sensor, within a time span, to determine a change in relative position of the apparatus as a function of the acceleration signal, the rotation rate signal, and the magnetic field signal, and to output a first signal by way of the communication interface if the change in position is greater than a first threshold value;

wherein the apparatus is provided for stationary mounting on a mobile object, wherein the first threshold value defines a security zone around the mobile object, and wherein the first signal is output if the mobile object leaves the security zone, wherein the change in the relative position is determined as follows:
  I. sampling the acceleration signal, the rotation rate signal, and the magnetic field signal, to obtain measured values;
  II. filtering the measured values;
  III. interpolating between the measured values;
  IV. fusing the measured values to determine a gravity vector, an orientation, and a linear acceleration;
  V. correcting those values of the linear acceleration which are less than an acceleration noise threshold value;
  VI. correcting a positioning error using an extended Kalman filter; and
  VII. determining the change in relative position of the apparatus as a function of the ascertained gravity vector, the orientation, and the linear acceleration.

2. The apparatus as recited in claim 1, wherein the apparatus is configured to be brought by way of the communication interface into a monitoring state, and to terminate that state again.

3. The apparatus as recited in claim 1, wherein the processing unit is configured to output a second signal by way of the communication interface if the change in position is greater than a second threshold value, the second threshold value being less than the first threshold value.

4. The apparatus as recited in claim 1, wherein the processing unit is configured to receive an interrupt signal from at least one of: (i) the acceleration sensor, (ii) the rotation rate sensor, (iii) the magnetic field sensor, and (iv) a further sensor.

5. The apparatus as recited in claim 4, wherein the further sensor is at least one of a light sensor and a microphone.

6. The apparatus as recited in claim 1, wherein the communication interface has at least one radio module, the radio module including at least one of a GSM module, a Bluetooth module, and a WLAN module.

7. The apparatus as recited in claim 1, wherein the apparatus has a GPS module.

8. The apparatus as recited in claim 1, wherein the processing unit is configured to acquire at least one of the first threshold value and a second threshold value.

9. A method for theft detection using an apparatus that has an acceleration sensor, a rotation rate sensor, and a magnetic field sensor, the method comprising:

a. acquiring an acceleration signal of the acceleration sensor, a rotation rate signal of the rotation rate sensor, and a magnetic field signal of the magnetic field sensor, within a time span;
  b. determining a change in relative position of the apparatus as a function of the acceleration signal, the rotation rate signal, and the magnetic field signal;
  c. comparing the change in position with at least a first threshold; and
  d. outputting a first signal if the change in position is greater than the at least first threshold value, wherein the first threshold defines a security zone, and wherein the first signal is output if the position is beyond the security zone, wherein the change in the relative position is determined in method step b as follows:
  I. sampling the acceleration signal, the rotation rate signal, and the magnetic field signal, to obtain measured values;
  II. filtering the measured values;
  III. interpolating between the measured values;
  IV. fusing the measured values to determine a gravity vector, an orientation, and a linear acceleration;
  V. correcting those values of the linear acceleration which are less than an acceleration noise threshold value;
  VI. correcting a positioning error using an extended Kalman filter; and
  VII. determining the change in relative position of the apparatus as a function of the ascertained gravity vector, the orientation, and the linear acceleration.

10. The method as recited in claim 9, further comprising step e, which executes before method step a and in which the apparatus is brought into a monitoring state, and step f, which executes after one of method step c or method step d, and in which a check is made as to whether the monitoring state has been terminated, the method being terminated if so, and execution continuing with method step a if not.

11. The method as recited in claim 9, further comprising a method step g, which executes directly before method step a and in which an interrupt signal is received from at least one of the acceleration sensor, the rotation rate sensor, the magnetic field sensor, and a further sensor.

12. The method as recited in claim 9, further comprising a method step h, in which the change in position is compared with a second threshold value that is less than the first threshold value, and a method step i in which a second signal is outputted if the change in position is greater than the second threshold value.

13. The method as recited in claim 9, further comprising a method step j, which executes before method step d and in which at least one of a radio module and a GPS module is made operationally ready.

14. The method as recited in claim 9, further comprising a method step k, which executes before method step b and in which at least one of the first threshold value and a second threshold value, are acquired.

* * * * *